March 6, 1934. H. A. HACKETT 1,949,468
CAFE TABLE OF THE TRAVELING CONVEYER TYPE
Filed Sept. 28, 1931
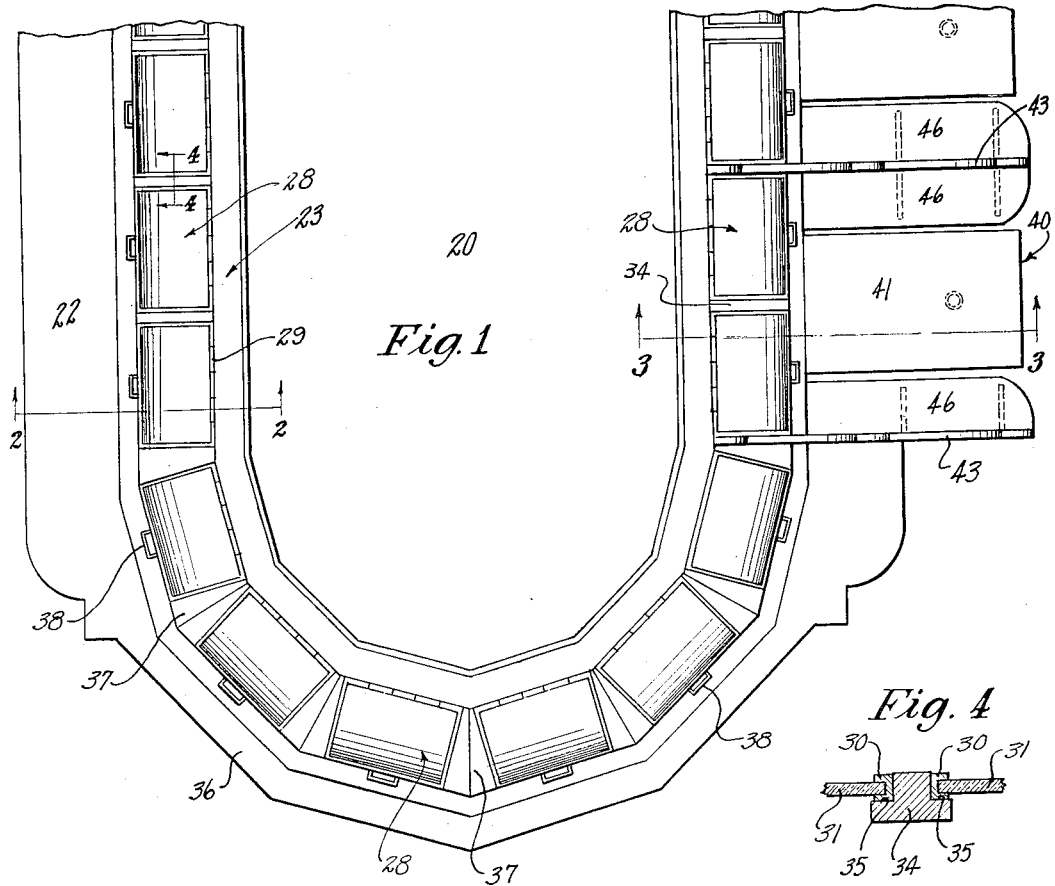
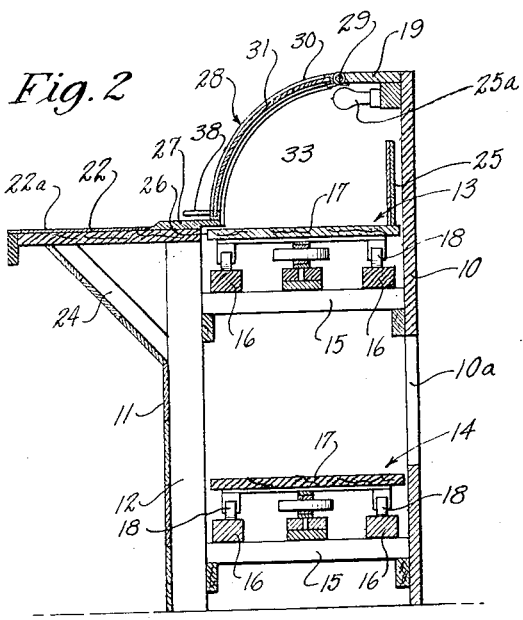
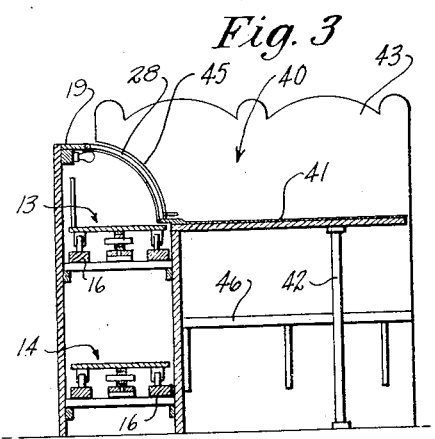
Inventor
Harold A. Hackett.
Attorney.

Patented Mar. 6, 1934

1,949,468

UNITED STATES PATENT OFFICE 1,949,468

CAFÉ TABLE OF THE TRAVELING CONVEYER TYPE

Harold A. Hackett, Huntington Park, Calif., assignor, by mesne assignments, to Gustav W. Kramm, San Francisco, Calif.

Application September 28, 1931, Serial No. 565,685

15 Claims. (Cl. 186—1)

This invention has to do in general with café tables or counters of the automatically or self serving, traveling conveyer type. Self serving tables of this character usually are of a circuitous form, circular, oval or the like, surrounding an interior space occupied by the waiters, and contain an endless conveyer upon which the food is placed and carried around past the customers seated at the table, such dishes as may be desired being removed from the conveyer by the customers.

The present invention deals particularly with cabinet construction for such tables, and in certain of its broad aspects, independently of the form, number or arrangement of the conveyers therein. I preferably, though not necessarily, utilize a pair of conveyers arranged one above the other in the table cabinet, the upper operating as the serving conveyer, that is the conveyer upon which the food is carried from the kitchen to the customers, and the lower conveyer being used for carrying dirty dishes back to the kitchen.

The invention is concerned in one of its aspects with the cabinet structure above the serving conveyer. It is desirable that the serving conveyer and the food carried thereon be enclosed, and yet be entirely visible to the customers to enable them to make their food selections, and also readily accessible to permit removal from the conveyer of the food selected. It is one object of the invention to provide a cabinet structure having these desirable features, in addition to other novel features characteristic of the particular type of table herein described.

Ordinarily in self serving tables of this type, the customers are seated at counters extending around or along one or more sides of the table, the counters extending along the outside of the serving conveyer. It is a further object of the invention to depart from the conventional counter construction, as described, by providing an arrangement of booths along the outside of the table, in place of the usual counter. In accordance with the invention, the booths are so constructed and arranged with reference to the cabinet of the table proper, as to afford extreme convenience for the occupants of the booths in selecting and taking food from the serving conveyer, and also to enable the serving capacity of this length of the table equipped with booths, to be increased at least 70%.

The above mentioned objects of the invention, as well as additional objects and features thereof, will be readily understood from the following detailed description, a typical and preferred form of the invention. Reference is had for purposes of description to the accompanying drawing, in which:

Fig. 1 is a plane view showing a fragmentary end portion of the table;

Fig. 2 is a vertical section on line 2—2 of Fig. 1, at the counter side of the table;

Fig. 3 is a similar section on line 3—3 of Fig. 1 at the booth side of the table; and Fig. 4 is a fragmentary section on line 4—4 of Fig. 1.

In Fig. 1, I show the front end portion of a self serving table of a general oval shape, the rear end portion of the table being similarly shaped to form a continuous or circuitous table structure. It may be stated that the rear end of the table will extend into the kitchen, not shown, wherein the foods are placed on the upper serving conveyer, and dirty dishes removed from the lower conveyer. Referring now to Fig. 2, the frame or cabinet structure of the table comprises spaced inner and outer walls 10 and 11, a series of posts 12 being arranged at suitable spaced intervals along the inside of the outer wall. A pair of horizontal endless conveyers 13 and 14 are mounted within the cabinet, the upper serving conveyer 13 being adapted to carry food for selection by the customers seated around the table, and the lower conveyer 14 serving as a carrier for dirty dishes to be returned to the kitchen. The conveyers are supported on transverse members 15 and laterally spaced track rails 16 extending longitudinally of the cabinet. Each of the conveyers comprises a plurality of flat surface top sections 17 supported on rollers 18 which ride the track 16, the conveyers being driven by suitable means, not shown, so as to travel continuously in a circuitous path within the table cabinet. It will be unnecessary to enter into a detailed description of the conveyer, since the conveyer construction is independent of the present invention and is fully shown and described in my copending application to which I hereinabove refer.

The inner wall 10 of the cabinet extends a suitable distance above the serving conveyer 13, and supports a horizontal counter or shelf 19 which projects outwardly from the wall over the conveyer. Shelf 19 is provided primarily for the purpose of enabling objects to be placed thereupon in positions accessible both to the customers seated at the counter or booths, hereinafter described, and to the waiters within the space 20 enclosed by the table. At the left side, as viewed in Figs. 1 and 2, the cabinet is provided with a counter 22 extending along the straight stretch 23 of the cabinet, the counter being supported on posts 12 and brackets 24, preferably at a height such that the top surface of the counter is substantially level with the top surface of the serving conveyer. A vertical wall 25, preferably comprising a mirror reflecting toward the counter, is mounted on the inner edge of each conveyer top section. Wall 25, in addition to serving as a reflecting surface to more effectively display the food in the conveyer, serves also to prevent objects or utensils from falling down through the conveyer. Lamps 25a are supported on the rear cabinet wall 10 above the mirror, and project within space 33 forwardly of the mirror. The forward edge 26 of the conveyer also extends in close proximity to the counter 22, but as an added precaution for precluding the possibility of persons reaching across the counter to the conveyer, from having their fingers become caught between the conveyer and counter, I provide a cleat 27 extending longitudinally along and on top the inner side of the counter and projecting inwardly and in overlapping relation with the conveyer. The counter 22 may be covered with a layer 22a of linoleum or other suitable surfacing material extending to the edge of cleat 27, the latter being tapered at its outer edge, as shown, to the thickness of the counter surface layer 22a.

A series of vertically swinging doors 28, positioned in end to end arrangement, are hinged at 29 to the forward edge of shelf 19, each of the doors consisting of a bracket 30 within which is confined a glass panel or pane 31. Hinges 29 are preferably of a spring tension type which serve to counterbalance the weight of the doors, thereby facilitating their lifting and obviating the possibility of their becoming broken by dropping from open raised positions. Doors 28 extend downwardly and outwardly from shelf 19 to rest upon cleats 27 at the outside of the conveyer. As a particular feature of advantage in providing maximum clearance within space 33 between conveyer 17 and the doors 28, I preferably shape the latter with a downward and outward curvature, to the end that dishes or other objects may be carried on substantially the full width of the conveyer toward the counter and nearest the customers, without such objects coming into engagement with the doors. At the straight or side portions of the table, brackets or frame members 34, extend downward from shelf 19 to cleat 27, brackets 34 having a curvature corresponding to that of the doors, and being shaped in section as shown in Fig. 4 to provide shoulders at 35 for engaging, and supporting if desired, the ends of the doors. These also serve to prevent dust or foreign matter from falling onto the food on the conveyer. As shown in Fig. 2, the lower ends of the frame members or brackets 34 between the ends of the swinging doors, are supported on cleat 27.

As shown in Fig. 1, shelf 19 extends around the forward curved end of the table, and while if desired, counter 22 may likewise be extended around the curved end of the table, it may be preferable, in order to add to the appearance of the table, to discontinue the counters at the ends of the straight side portions of the table and to provide merely a narrow ledge 36 around the forward end thereof. Panels 37 are interposed between adjacent ends of the doors at the curved end of the table to compensate for their increased spacing by virtue of their circular arrangement.

The doors at the end may or may not be hingedly mounted for opening, since in case the front end of the table is not used for serving, the doors may be formed simply as non-opening panels. Ordinarily however it is preferred that the doors at the end as well as the sides of the counter be capable of opening, and are so illustrated.

The space or individual extent of the doors 28 is such as to provide a single door opposite each customer seated at the counter. As the food is carried on conveyer 17 past the customer at the counter, the customer lifts the door 28 and removes the selected dish from the conveyer, handles 38 being fixed to the doors to facilitate their lifting. As will be noted, as the door is raised, its lower end swings outwardly over the counter 22. Cleat 27 preferably is extended outwardly on the counter a distance sufficient to prevent any object being placed on the counter in such close proximity to the door as to become struck by the door as the latter is raised.

The height of shelf 19 will be such that objects placed thereupon will be conveniently accessible to the customers seated at the counter and also such that the waiters at the inside of the table may remove dishes from the counter. Dirty dishes taken from the counter are placed upon conveyer 17, the latter being accessible through openings 10a in the inner wall of the cabinet.

It will be seen that by reason of the comparatively narrow width of the brackets 34, the series of glass doors 28 presents a substantially continuous transparent wall through which a considerable length of the conveyer is visible from any one point at the counter. This feature is of particular advantage, and in fact a necessary one, in that a customer being served must be given an opportunity to view the foods carried on the conveyer for a length of time prior to the arrival of the foods at his position, to enable him to make selections. In other words, if the customer were able to view the foods only through the door opposite his position at the counter, even though the conveyer moves reasonably slow, the customer would not be given ample opportunity to make selections. Thus the advantages and novelty in arranging the glass doors in accordance with the invention, and as particularly shown in Fig. 1, becomes readily apparent.

At the right side of the table in Fig. 1, and in Fig. 3, I show the arrangement of booths, in lieu of a counter 22 as previously described. While in some instances it may be preferable to utilize a counter at both sides of the table, it may in other installations be preferred to provide booths at one or both sides of the table, for advantageous reasons that will hereinafter appear. For purposes of illustrating both forms however, I have shown the table to have a counter at one side and a series of booths in novel arrangement at the other side.

Each of the booths, generally indicated at 40, comprises a table 41 shown typically as being supported on column 42, the position of the table thus corresponding to that of a section of the previously described counter 22. As shown in Fig. 1, each of the booth tables 41 is arranged opposite a pair of the doors 28, the center of the table, longitudinally of the doors, being substantially at a bracket 34 between the doors. The booth partitions 43 are spaced apart twice the distance of the door spacing, the partitions extending outwardly from the bracket 34 at the ends of each pair of doors opposite the tables 41. Preferably the top portions of the partition 43 extend above the table 41 and inward to substantially the forward edge of shelf 19, the lower edge of the inward part of the partition being curved as at 45 in conformity with the shape of the brackets 34. Seats 46 are supported on the partitions 43 or in any other suitable manner, at opposite sides of the table 41.

It will be noted that by virtue of the illustrated arrangement of booths, the serving capacity of the table is more than doubled in comparison with the serving capacity at the counter side. As previously mentioned, at the counter side of the table, ordinarily but one person is seated opposite each of the doors 28, whereas by virtue of the described booth arrangement, at least two persons occupying one of the seats 46, can be served opposite a single door section of the table. The serving capacity of the booths may be further increased by seating a fifth party at the outer end of the table. The illustrated arrangement of the doors 28 within the booths is of particular convenience in that an individual door is provided for the occupants of each individual booth seat, so that where the booth seats are occupied by separate parties, they may remove their selected foods from the conveyer without interference. As will be seen, provision of booths in combination with the self serving table, affords all the conveniences of the former where service is had at a counter, and in addition the desirable and generally preferred conveniences offered by the booths.

I claim:

1. A café table of the character described comprising, spaced inner and outer walls, a horizontally extending serving conveyer mounted between said walls, said inner wall extending above the conveyer, a member extending along and vertically above and in close proximity to the outer top surface of the conveyer, said member being mounted on and projecting inwardly from said outer wall, and means enclosing the space above said conveyer comprising a vertically swinging door pivotally supported on said inner wall and extending downwardly toward the outside of the conveyer.

2. A café table of the character described comprising, spaced inner and outer walls, a horizontally extending serving conveyer mounted between said walls, said inner wall extending above the conveyer, a shell mounted on said inner wall and projecting outwardly and part way only over said conveyer, a vertically swinging, downwardly curved door pivotally mounted on said shelf and extending downwardly toward the outside of said conveyer, and a member extending along and vertically above and in close proximity to the outer top surface of the conveyer, said member being mounted on and projecting inwardly from said outer wall.

3. A café table of the character described comprising, spaced inner and outer walls, a horizontally extending conveyer mounted between said walls, said inner wall extending above the conveyer, a counter extending outwardly from said outer wall and at substantially the level of said conveyer, a shelf mounted on said inner wall and projecting outwardly over said conveyer, a member supported on the inner side of said counter and extending longitudinally in overlapping relation with said conveyer, and a vertically swinging door pivotally mounted on said shelf and extending downwardly to rest on said member.

4. A café table of the character described comprising, spaced inner and outer walls, a horizontally extending serving conveyer mounted between said walls, said inner wall extending above the conveyer, means enclosing the space above said conveyer comprising a vertically swinging door pivotally supported on said inner wall, and a booth structure at the outside of said outer wall comprising, a table extending outwardly from the outer wall and at substantially the level of said conveyor, and spaced partitions extending outwardly from said outer wall at opposite sides of said table.

5. A café table of the character described comprising, spaced inner and outer walls, a horizontally extending conveyer mounted between said walls, said inner wall extending above the conveyer, a counter extending outwardly from said outer wall and at substantially the level of said conveyer, means enclosing the space above said conveyer comprising a pair of vertically swinging doors arranged substantially end to end and pivotally mounted on said inner wall and extending downwardly to the outside of said conveyer, and a booth structure comprising a table extending outwardly from said outer wall at substantially the level of said conveyer, the center of said table, longitudinally of said outer wall, being at substantially the adjacent ends of said swinging doors, and spaced partitions extending outwardly from said outer wall beyond the ends of said doors.

6. A café table of the character described comprising, spaced inner and outer walls, a horizontally extending serving conveyer mounted between said walls, said inner wall extending above the conveyer, a shelf mounted on said inner wall and projecting outwardly over said conveyer, a pair of downwardly curved vertically swinging doors in end to end arrangement pivotally mounted on said shelf and extending to the outside of said conveyer, and a booth structure comprising a table extending outwardly from said outer wall at substantially the level of said conveyer, the center of said table, longitudinally of said outer wall, being at substantially the adjacent ends of said swinging doors, and a pair of spaced partitions extending outwardly from said shelf and from the outer wall, beyond the ends of said swinging doors.

7. A café table of the character described comprising, an elongated and longitudinally moving conveyer, a counter or the like extending along the conveyer and outwardly from one side thereof, walls enclosing the space above said conveyer, said walls including a continuous shelf extending longitudinally of the conveyer at the top of said space, said shelf being provided to support objects in positions of accessibility from both sides of the table, a series of glass doors extending longitudinally of the conveyer and each hinged to said member so as to swing upwardly from said counter, a substantial length of the conveyer being visible through said glass doors from any one point at the counter.

8. A café table of the character described comprising, an elongated and longitudinally moving conveyer, a counter or the like extending along the conveyer and outwardly from one side thereof, walls enclosing the space above said conveyer, said walls including a vertically extending wall, a continuously extending shelf projecting from said wall at the top of said space and overlying the conveyer, said shelf being provided to support objects in positions of accessibility from both sides of the table, a series of glass doors extending longitudinally of the conveyer and each hinged to said shelf so as to swing upwardly from said counter, a substantial length of the conveyer being visible through said glass doors from any one point at the counter, and said doors presenting a substantially continuous transparent wall along the side of the conveyer.

9. A café table of the character described comprising, an elongated and longitudinally moving conveyer, a counter or the like extending along the conveyer and outwardly from one side thereof, walls enclosing the space above said conveyer, said walls including a series of glass doors extending longitudinally of the conveyer and each mounted to swing upwardly from said counter, so that a substantial length of the conveyer is visible through said glass doors from any one point at the counter, and a member projecting inwardly from said counter to overlie the outer portion of the conveyer to prevent the dropping of objects between the conveyer and counter.

10. A café table of the character described comprising, an elongated and longitudinally moving conveyer, a counter or the like extending along the conveyer and outwardly from one side thereof, walls enclosing the space above said conveyer, said walls including a series of glass doors extending longitudinally of the conveyer and each mounted to swing upwardly from said counter, so that a substantial length of the conveyer is visible through said glass doors from any one point at the counter, and a member projecting inwardly from said counter to overlie the outer portion of the conveyer to prevent the dropping of objects between the conveyer and counter, said doors extending downwardly to the top surface of said member.

11. A café table of the character described comprising, an elongated and longitudinally moving conveyer, a counter or the like extending along the conveyer and outwardly from one side thereof, walls enclosing the space above said conveyer, said walls including a back wall, a continuously extending shelf projecting over the conveyer from said back wall, and a series of glass doors arranged end to end and extending longitudinally of the conveyer, each door being hinged to said shelf so as to swing upwardly from said counter and a substantial length of the conveyer being visible through said glass doors from any one point at the counter, and a series of brackets between said doors and extending downwardly from said shelf toward the counter, adjacent ends of said doors in closed position overlapping a single one of said brackets.

12. A café table of the character described comprising, an elongated and longitudinally moving conveyer, a counter or the like extending along the conveyer and outwardly from one side thereof, walls enclosing the space above said conveyer, said walls including a back wall, a shelf projecting from said back wall over the conveyer, and a series of downwardly curved glass doors hinged to said shelf and extending longitudinally of the conveyer and each mounted to swing upwardly from said counter, so that a substantial length of the conveyer is visible through said glass doors from any one point at the counter, and a series of curved brackets extending downwardly between said doors from said shelf, the edges of adjacent doors being fitted to said brackets.

13. A structure of the character described comprising, a cabinet, a serving conveyer within said cabinet, a booth structure at one side of said cabinet and comprising a pair of spaced walls extending outwardly from the cabinet, a table between said walls, there being a seating space between one side of said table and one of said walls, and a door mounted on said cabinet at the inner end of said table and extending adjacent portions of the ends of both said table and the seating space, said conveyer being accessible from the booth through the door opening.

14. A structure of the character described comprising, a cabinet, a serving conveyer within said cabinet, a booth structure at one side of said cabinet and comprising a pair of spaced walls extending outwardly from the cabinet, a table between said walls and spaced therefrom, and a pair of vertically swinging doors mounted on said cabinet at the inner end of said table and extending adjacent portions of the ends of both said table and the spaces between the table and walls, said conveyer being accessible from the booth through the door openings.

15. A structure of the character described comprising, a cabinet, a serving conveyer within said cabinet, a booth structure at one side of said cabinet and comprising a pair of spaced walls extending outwardly from the cabinet, a table between said walls and spaced therefrom, and a pair of vertically swinging doors mounted on said cabinet opposite the inner end of said table and extending from said walls to substantially the center of the table, said conveyer being accessible from the booth through the door openings.

HAROLD A. HACKETT.